Patented Jan. 8, 1924.

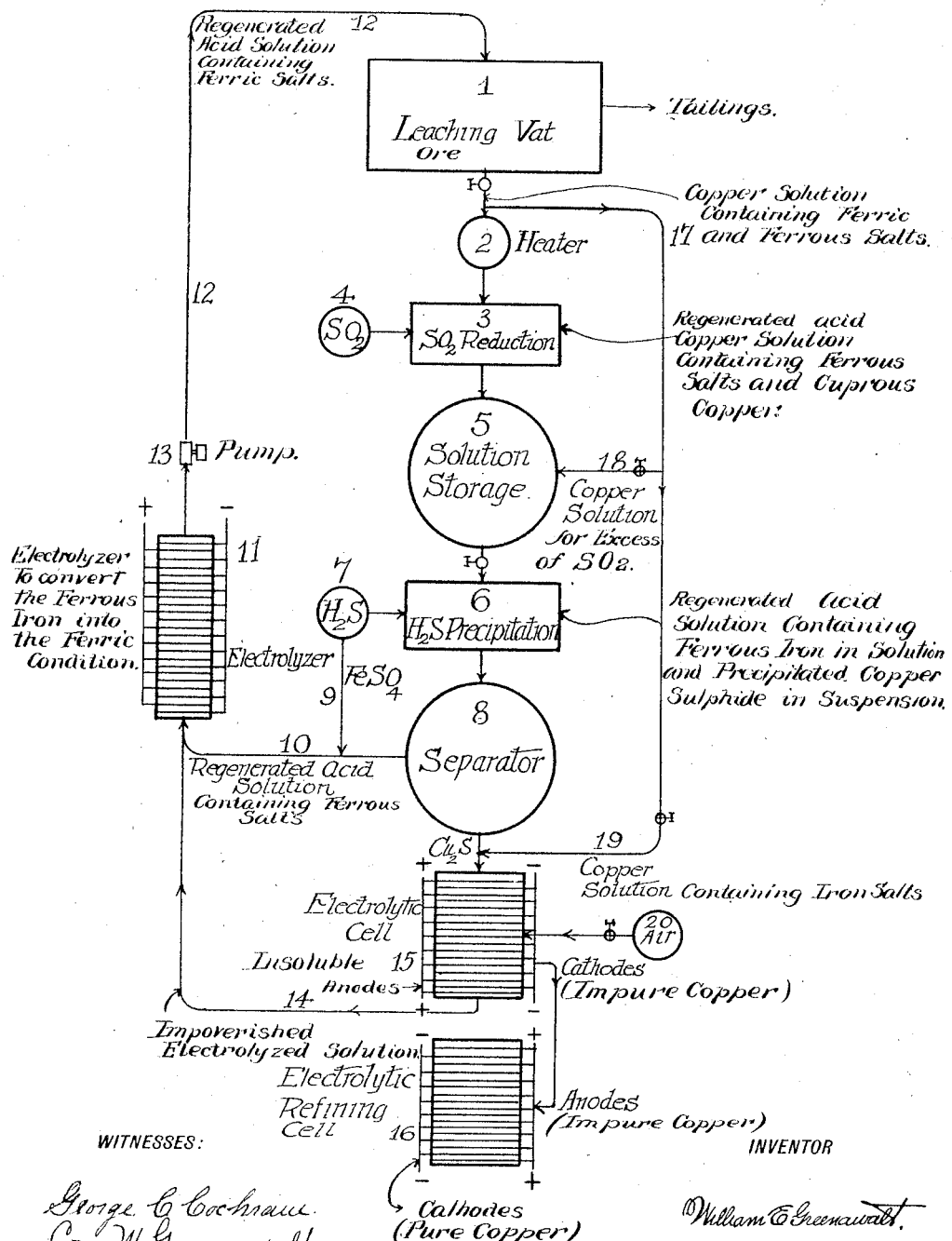

1,480,059

UNITED STATES PATENT OFFICE.

WILLIAM E. GREENAWALT, OF DENVER, COLORADO.

METALLURGICAL PROCESS.

Application filed April 16, 1918, Serial No. 228,952. Renewed March 7, 1921. Serial No. 450,460.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

The invention relates more particularly to the extraction of copper from its ores by solvent processes, in which the solvent is regenerated by electrolysis.

It is well known that oxidized ores of copper are readily soluble in acid solutions and that the sulphide minerals are hardly effected thereby. Ferric salts readily dissolve the copper from its oxide minerals, and also quite readily dissolve the copper from the sulphide minerals, especially from chalcocite and chalcopyrite. The objection to ferric salt solutions has been, that, in dissolving the copper much of the iron is eliminated as a basic salt; that the acid required for regeneration of the solvent is not readily available; that electrolytic deposition of the copper from solutions strong in iron is difficult; and that the regeneration of the ferric salt, in any case, can not, ordinarily, be effectively accomplished. It is the object of this process to so eliminate, or modify, these difficulties, to make an economical working process, especially on ores low in copper and containing a large amount of injurious impurities.

If an acid solution of ferric sulphate is applied to a mixed oxide and sulphide ore, the reactions may be represented as follows:

1. $CuO + Fe_2(SO_4)_3 = CuSO_4 + 2FeSO_4$.
2. $Cu_2S + Fe_2(SO_4)_3 =$
$CuSO_4 + CuS + 2FeSO_4$.
3. $CuS + Fe_2(SO_4)_3 = CuSO_4 + 2FeSO_4 + S$.

The copper goes into solution, while the ferric iron is reduced to the ferrous condition. It is desirable to use a solution high in iron, to dissolve the copper, if the ferric sulphate is to be effectively applied. Such solutions, especially if lean in copper, are not readily precipitated electrolytically. They may be precipitated with iron, but with iron precipitation, both the iron and the combined and uncombined acid are irrecoverably lost. Besides, the iron is expensive and not always obtainable at copper mines. In my present process, I precipitate the copper with hydrogen sulphide, generated by the action of acid on iron matte, thus:

4. $FeS + H_2SO_4 = FeSO_4 + H_2S$.

The hydrogen sulphide is applied to the solution to precipitate the copper as the sulphide, with the simultaneous regeneration of an equivalent of acid:

5. $CuSO_4 + H_2S = CuS + H_2SO_4$.

The acid so generated, effectively acts to retain the iron in the solution, and makes the effective regeneration of the ferric salts possible. Some of the iron will inevitably be lost, either by the oxidation to an insoluble form, by the formation of basic salts, and by the wash waters which are too lean to be added to the solvent. To supply this deficiency, I introduce the ferrous salt formed in the hydrogen sulphide generation, into the solution for the copper. This residue from the generation of the hydrogen sulphide usually also contains some free acid.

After the copper has been precipitated, and the ferrous salt from the generation of the hydrogen sulphide added to the solution, all the iron is in the ferrous condition, and as such, is not available for the solution of the copper from the ore. Ferric sulphate dissolves copper; ferrous sulphate does not. In order to convert the ferrous iron into the ferric iron, the solution is electrolyzed, and the acid regenerated in the precipitation of the copper, as set forth in equation 5, makes effective electrolytic regeneration of the ferric salts possible, as shown by equation:

6. $2FeSO_4 + H_2SO_4 + electrolysis = Fe_2(SO_4)_3 + H_2$, or

7. $2FeSO_4 + H_2SO_4 + O + electrolysis = Fe_2(SO_4)_3 + H_2O$.

It would be quite possible, if desired, to electrolyze a neutral solution of ferrous sulphate, but in such an event some of the iron would be lost as the oxide and some as a basic insoluble salt. I prefer, for the purpose of the present process to electrolyze the solution in the presence of the acid regenerated in the precipitation of the copper, and thus make the process cyclic and continuous, using the ferrous salt produced by the generation of the hydrogen sulphide.

Chloride solutions offer a certain advantage over sulphate solutions. If the copper ore contains precious metals, the precious metals are extractable with the copper. There is also some advantage in electrolytically converting the ferrous chloride to the ferric chloride, in that carbon anodes can be used and the nascent chlorine liberated at the anode acts more effectively than ordinary chlorine in raising the valency of the ferrous salts. Then, too, the ferrous chloride, acting as a depolarizer, tends to materially reduce the E. M. F. required in the electrolysis. Effective agitation, during electrolysis, is desirable; this not only aids the depolarization, but also the oxidation, or adduction, of the ferrous salts. It has been observed that carbon electrodes give a better depolarization, and consequently a lower E. M. F. than lead, ferro-silicon, or magnetite electrodes. If carbon anodes are used in a sulphate solution, there is danger of excessive anode disintegration. On the other hand, carbon anodes are quite durable in chloride solutions, especially in acid chloride solutions, and in solutions containing large quantities of ferrous salts which make possible a high efficiency in depolarization.

The following reaction will explain the steps quite clearly when chloride solutions are used, containing ferric chloride to extract the copper. If the ferric chloride solution is applied to the ore, the copper goes into the solution as the chloride, while the ferric chloride is reduced to the ferrous condition:

8. $CuO + 2FeCl_3 = CuCl_2 + 2FeCl_2$.
9. $Cu_2S + 4FeCl_3 = 2CuCl_2 + 4FeCl_2 + S$.

In order to save hydrogen sulphide, and in order to regenerate a sufficient amount of acid, sulphur dioxide is first applied to the copper solution to reduce any excess of ferric chloride to the ferrous condition and to reduce the cupric chloride to the cuprous chloride:

10. $2FeCl_3 + SO_2 + 2H_2O = 2FeCl_2 + H_2SO_4 + 2HCl$.
11. $2CuCl_2 + SO_2 + 2H_2O = 2CuCl + H_2SO_4 + 2HCl$.

The hydrogen sulphide is then applied, which results in the regeneration of more acid, and the production of a higher grade precipitate:

12. $2CuCl + H_2S = Cu_2S + 2HCl$.

The regenerated acid solution, now completely reduced, is separated from the copper sulphide precipitate, and electrolytically regenerated in ferric chloride, mostly, if not entirely, at the expense of the regenerated acid, as shown by equations 10, 11, and 12;

13. $FeCl_2 + HCl + electrolysis = FeCl_3 + H$.
14. $HCl + electrolysis = H + Cl$.
15. $FeCl_2 + Cl = FeCl_3$.
16. $3FeCl_2 + 3H_2O + electrolysis = FeCl_3 + Fe_2O_3 + 3H$.

This regenerated ferric chloride solution is then again returned to the ore to pass through another cycle. The ferrous iron from the hydrogen sulphide generator may be added to the leaching solution and the ferrous iron regenerated with the rest of the ferrous iron. If a chloride solution is used in leaching, it is desirable to use considerable sodium chloride; this assists in keeping silver chloride and cuprous chloride in solution, which otherwise would not be readily soluble. The regenerated sulphuric acid reacts with the sodium chloride to form hydrochloric acid. It will be seen that the acid regenerated in the precipitation of the copper and the reduction of the variable valent salts, plays an important part in the regeneration of the ferric salts.

This process is somewhat of an inversion of the usually proposed methods of precipitating and electrolyzing copper solvents, in that the electrolysis is performed after the copper is precipitated, instead of attempting to precipitate the copper electrolytically with the simultaneous regeneration of the solvent. There are, however, certain very marked advantages in this apparently duplication of methods: first, acid is usually very expensive in mining districts and this method supplies an abundance of acid; second, if chloride solutions are used, it permits of the extraction of the precious metals with the copper, as also much of the lead, if present: third, the chemical precipitation in addition to regenerating an abundance of acid, leaves the iron in the ferrous condition, and this iron is an effective depolarizer in the electrolytic generation of the ferric salts, thus greatly reducing the E. M. F. required in the operation: fourth, it permits of the use of carbon anodes in the production of the ferric salts: fifth, it permits of effective electrolytic generation of ferric salts, which is not possible, or at least advisable, simultaneously with the deposition of the copper: sixth, the foulness of the solution is practically immaterial, and a high iron content is desirable, not only in leaching with ferric salts, but in the electrolytic regeneration of the ferric salts: seventh, both the iron and the acid used in the production of the hydrogen sulphide for the precipitation of the copper may be turned to profitable account.

It is a difficult matter to electrolytically precipitate copper from chloride solutions without diaphragms, especially if effective regeneration of the solvent is desired. Conditions may arise in which not only no copper is deposited, but the original cathode sheet, itself, may be dissolved; this is largely due to the action of the regenerated ferric salts, and to the cupric salts, and to the liberation of free chlorine. If an attempt is made to avoid the liberation of chlorine by excessive agitation of the electrolyte, the re-dissolving of the cathode copper may be increased rather than diminished; this will usually be the case. By the present method of hydrogen sulphide precipitation with a simultaneous regeneration of acid, and then electrolyzing the precipitated solution in the presence of the regenerated acid to produce ferric salts, there are some advantages, and many serious difficulties are avoided, even if the end product is not the pure electrolytic copper.

No special apparatus is required to carry out the invention, however, the electrolytic apparatus shown in my co-pending applications, Serial Nos. 145,884 and 185,652, filed February 1, 1917, and August 11, 1917, respectively is preferred for the electrolytic regeneration of the ferric salts after the hydrogen sulphide precipitation of the metals and the regeneration of the acid. This regenerated acid plays an important part in the electrolytic regeneration of the solvent, and also an important part in the leaching.

In electrolyzing the solution to convert the ferrous iron into the ferric condition, agitation is desirable during electrolysis. Better results are also obtained by heating the solution. The best results are obtained with a fairly warm solution and fairly energetic agitation. A temperature of 120 to 180 degrees F. will give good results. Carbon electrodes are preferred, especially with chloride solutions, for, with carbon electrodes, the depolarization, and the oxidation or adduction of the solution, is more effective than when lead, magnetite, or ferro-silicon electrodes are used, and the E. M. F. necessary for the electrolysis is appreciably reduced. The disintegration of the electrodes, under the conditions, is quite small. The heating of the solution is preferably done before the chemical reduction or precipitation, since these reactions, especially the reduction of the cupric chloride to the cuprous chloride by means of sulphur dioxide is greatly facilitated by heating.

The equations given in the description of the process are tentative, and are only supposed in a general way to illustrate what takes place.

If sulphur dioxide is used preparatory to hydrogen sulphide precipitation, it is advisable to avoid an excess of sulphur dioxide, to avoid the precipitation of sulphur,

17. $2SO_2 + H_2S = 2H_2O + 3S$.

This may be done by providing ample storage for the reduced solution, and if there is any excess of sulphur dioxide, enough unreduced solution, from the ore can be run into the storage tank 5, through the pipes 17 and 18 to combine with the excess of sulphur dioxide.

The accompanying drawing represents a flow sheet of the preferred method of carrying out the invention as applied to chloride solutions, and will perhaps give a better idea of how the invention is intended to be carried out practically.

In the drawing, 1 is a leaching vat containing the ore to be treated, say, with a chloride solution. The resulting copper solution issuing from the leaching vat is flowed into the heater 2, where it is heated preparatory to the reduction with sulphur dioxide. The heated solution enters the reduction chamber 3, where it is treated with sulphur dioxide from the sulphur dioxide generator 4. The cupric chloride is reduced to the cuprous chloride according to equation 11, and the ferric chloride is reduced to the ferrous chloride as shown by equation 10, with the simultaneous regeneration of acid. The reduced solution then flows into a storage tank 5, where more time is given for the excess of sulphur dioxide to act on the solution, and fresh solution added to the reduced solution through the pipes 17 and 18 to act upon the excess of the gas.

The reduced copper solution is then drawn from the storage tank 5, in a regulated stream, into the hydrogen sulphide precipitator 6, where it is acted upon by the hydrogen sulphide from the generator 7, to precipitate the copper as the sulphide, as shown by equation 12, with the simultaneous regeneration of more acid. The regenerated acid solution together with the sulphide precipitate flows into the separator, such as a Dorr thickener, where the regenerated acid solution is separated from the sulphide precipitate. The regenerated acid solution flows through the pipe line 10, into the electrolyzer 11, where the ferrous iron is converted into the ferric condition, as shown by equations 13, 14, 15, and 16. It then flows into the pump 13 and is returned to the leaching vat through the pipe line 12, to pass through another cycle. The ferrous sulphate formed in the hydrogen sulphide generator 7, may be added to the stream of solution through the pipe line 9. The ore in the leaching vat may be treated either by agitation or by percolation, or a combination of both.

One objection to hydrogen sulphide precipitation has been the voluminous nature of the sulphide precipitate, and the difficulties due to filtration, drying, and fusing the dried precipitate. I have found that these difficulties can be overcome by electrolyzing the precipitate sludge. Quite a pure copper can be obtained in this way with a very high current, and a very high energy, efficiency. To carry it out practically a certain amount of the rich copper solution from the leaching vat is drawn from the circuit thru the pipes 17 and 19, and mixed with the thickened copper sulphide precipitate from the separator, and the mixture introduced into the electrolytic cell 15. The mixture is electrolyzed, and during electrolysis, it is preferably agitated with air. In this way a fairly good deposit of copper can be obtained, with little or no electrolytic difficulties. It might be supposed that a great deal of sulphur would be liberated by the electrolytic action, but the amount liberated appears to be quite small. It does not appear to correspond with the equations,

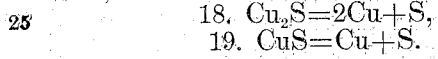

It appears to be considerably less, and very small, if the mixture is agitated. It is probable that some of the sulphur is converted into a soluble form—possibly into sulphuric acid—for it is well known that under certain conditions of electrolysis, and especially under highly oxidizing influences, elemental sulphur can be converted into sulphuric acid. The deposit is coherent, and fairly pure. The exhausted copper solution flows through the pipe 14 into the electrolyzer 11. Compressed air may be drawn from the air receiver 20, for agitation, as desired.

If purer cathodes are desired than those produced in the cell 15, cathodes of great purity may be obtained by lifting the impure cathodes out of cell 15 when they have sufficient copper deposited on them, and placing them in the electrolytic refining cell 16, as anodes, and refining these anodes much the same as in regular electrolytic refining. The electrolyte in the refining tank should be a fairly pure acid solution of copper sulphate. The electrolyte in cell 15 may be quite impure; the regular rich copper leaching solution is preferred.

In the preliminary reduction of the iron salts before precipitating the copper, either sulphur dioxide or hydrogen sulphide will answer the purpose, but sulphur dioxide will ordinarily be preferred, if a preliminary reduction is desired.

If the sulphide precipitate sludge is electrolyzed with the rich leach solution, there will, of course, be considerable iron in the electrolyte. It is preferred to use the rich leach solution as the electrolyte, because the metal can largely be recovered from the rich leach solution in the presence of the precipitated copper sulphide with a very high efficiency, and the iron, in the electrolyte, in the electrolysis of the copper sulphide precipitate, will help to bring the copper in solution during the electrolytic action.

Either sulphur dioxide or hydrogen sulphide will reduce the ferric iron to the ferrous condition. If hydrogen sulphide is applied to the solution without the application of sulphur dioxide, the ferric iron will be largely reduced before the copper is precipitated. Ordinarily, however, the preliminary treatment with sulphur dioxide will be preferred, for the reason that sulphur dioxide is cheaply produced, regenerates more acid, and the sulphide precipitate will usually be of a higher grade than when the hydrogen sulphide is applied direct.

I claim:

1. A metallurgical process comprising leaching ores of copper with an acid solution of ferric iron, generating hydrogen sulphide from acid and ferrous sulphide, precipitating the copper from the leach solutions with the hydrogen sulphide so formed, adding the ferrous sulphate formed in the generation of the hydrogen sulphide to the leach solutions, electrolyzing the ferrous iron in the leach solution in the presence of the regenerated acid to convert the ferrous iron into the ferric condition, and then applying the regenerated ferric iron solution to the ore.

2. A metallurgical process comprising treating ores of copper with an acid solution containing ferric iron, generating hydrogen sulphide from acid and ferrous sulphide, adding both the hydrogen sulphide and the ferrous sulphate so produced to the leach solutions, separating the resulting copper sulphide precipitate from the regenerated acid solutions, electrolyzing the regenerated acid solutions to convert the ferrous iron into the ferric condition, and then applying the regenerated ferric iron solution to the ore.

3. A metallurgical process comprising leaching ores of copper with an acid solution of ferric iron, precipitating the copper from the leach solutions with hydrogen sulphide, separating the resulting copper sulphide precipitate from the regenerated acid solution, electrolyzing the regenerated acid solution containing salts of iron to convert the ferrous iron into the ferric condition, and then applying the regenerated ferric iron solution to the ore.

4. A metallurgical process comprising treating ores of copper with an acid solution of ferric iron to dissolve the copper, treating the resulting copper solution with sulphur dioxide to reduce the salts of the variable valent elements in the solution from a higher to a lower valency with the simultaneous regeneration of acid, then precipitating the copper as the sulphide with hydrogen sulphide with the simultaneous regeneration of more acid, separating the reduced and regenerated acid solution from the sulphide precipitate, and then treating the reduced solution containing salts of iron to convert the ferrous salts into the ferric condition, and then returning the regenerated acid ferric salt solution to the ore.

5. A metallurgical process comprising treating ores of copper with an acid solution containing ferric iron to dissolve the copper, precipitating the dissolved copper with hydrogen sulphide with the simultaneous regeneration of acid, separating the sulphide precipitate from the regenerated acid solution, electrolyzing the regenerated acid solution to convert the ferrous salts into the ferric condition, agitating the solution during electrolysis, and then, when the solution is sufficiently regenerated in ferric salts returning it to the ore.

6. A metallurgical process comprising treating ores of copper with an acid solution of ferric iron to dissolve the copper, treating the resulting copper solution to reduce the variable valent salts in the solution from a higher to a lower valency, with the simultaneous regeneration of acid, then precipitating the copper as the sulphide with hydrogen sulphide with the simultaneous regeneration of more acid, separating the reduced and regenerated acid solution from the sulphide precipitate, and then electrolyzing the solution containing ferrous iron in the presence of the regenerated acid to convert the ferrous salts to the ferric condition, and then returning the regenerated ferric iron solution to the ore.

7. A metallurgical process comprising treating ores of copper with an acid solution of ferric iron to dissolve the copper, precipitating the dissolved copper with hydrogen sulphide with the simultaneous regeneration of acid, separating the sulphide precipitate from the regenerated acid solution, heating the solution, electrolyzing the heated regenerated acid solution to convert the ferrous salts into the ferric condition, and then when the solution is sufficiently regenerated in ferric salts returning it to the ore.

8. A metallurgical process comprising treating ores of copper with an acid solution of ferric iron to dissolve the copper, precipitating the copper with a precipitant capable of reducing the variable valent salts in the solution from a higher to a lower valency with the simultaneous regeneration of acid, separating the resulting precipitate from the regenerated acid solution, electrolyzing the reduced and regenerated acid solution to convert the ferrous iron to the ferric condition, and then returning the solution to the ore.

9. A process, comprising treating ores of copper with a solvent for the copper, precipitating the copper with hydrogen sulphide with the simultaneous regeneration of acid, separating the sulphide precipitate from the regenerated acid solution, returning the regenerated acid solution to the ore, and electrolyzing the sulphide precipitate to obtain the metal.

10. A process comprising treating ores of copper with an acid solution to dissolve the copper, precipitating the copper with hydrogen sulphide with the simultaneous regeneration of acid, separating the sulphide precipitate from the regenerated acid solution, returning the solution to the ore, mixing the sulphide precipitate with a solution of copper, electrolyzing the mixture, and agitating the mixture during electrolysis.

11. A process comprising treating ores of copper with an acid solution to dissolve the copper, precipitating the copper with hydrogen sulphide with a simultaneous regeneration of acid, electrolyzing the acid solution to convert the variable valent elements from a lower to a higher valency, returning the electrolyzed solution to the ore, mixing the sulphide precipitate with a copper solution, electrolyzing the mixture, and agitating the mixture during electrolysis.

12. A process comprising treating ores of copper with an acid solution to extract the copper, precipitating the copper with hydrogen sulphide with the simultaneous regeneration of acid, returning the acid solution to the ore, mixing the sulphide precipitate with a copper solution, agitating and electrolyzing the mixture whereby the copper is deposited on the cathodes, and then removing the cathodes and electrolyzing them in a different electrolyte as the anodes to obtain the pure electrolytic metal on new cathodes.

13. A process comprising treating ores of copper with an acid solution containing ferric iron to dissolve the copper, separating the resulting copper solution from the gangue, precipitating the copper with a precipitant capable of reducing the excess of ferric iron to the ferrous condition with a simultaneous regeneration of the acid combined with the copper, then treating the solution in the presence of the regenerated acid to raise the valency of the iron salts in the solution, and then again applying the regenerated acid solution containing ferric iron to the ore.

14. A metallurgical process comprising treating ores of copper with an acid solution to dissolve the copper, reducing the variable valent salts in the resulting copper solution from a higher to a lower valency with sulphur dioxide, precipitating the copper from the reduced solution with hydrogen sulphide, separating the sulphide precipitate from the regenerated acid solution, raising the valency of the variable valent salts in the regenerated acid solution and returning the solution to the ore, and electrolyzing the sulphide precipitate to recover the metallic copper.

15. A process comprising treating ores of metals with an acid solution containing salts of the variable valent elements to dissolve the metals, separating the resulting metal solution from the ore, treating the metal solution with a reagent capable of reducing the salts of the variable valent elements from a higher to a lower valency, precipitating the metals in the solution with hydrogen sulphide which are capable of being so precipitated, separating the sulphide precipitate from the reduced and regenerated acid solution, then raising the valency of the salts of the variable valent elements in the solution, and returning the regenerated acid salt solution to the ore.

16. A process comprising treating ores of copper with a solvent for the copper, precipitating the copper with hydrogen sulphide with the simultaneous regeneration of acid, separating the sulphide precipitate from the regenerated acid solution, returning the regenerated acid solution to the ore, and electrolyzing the sulphide precipitate in an electrolyte containing iron in solution to obtain the metallic copper.

17. A process comprising treating ores of copper with an acid solution containing ferric iron, generating hydrogen sulphide from acid and ferrous sulphide, applying both the hydrogen sulphide and the ferrous salt so produced to the leach solutions, separating the copper sulphide precipitate produced by the hydrogen sulphide from the regenerated acid solutions, electrolyzing the regenerated acid solutions to convert the ferrous iron into the ferric condition, and then applying the regenerated acid ferric iron solution to the ore to dissolve more copper.

18. A process comprising treating ores of copper with an acid solution containing ferric iron to dissolve the copper, generating hydrogen sulphide from acid and ferrous sulphide, applying both the hydrogen sulphide and the resulting ferrous salt to the leach solutions, separating the copper sulphide precipitate produced by the hydrogen sulphide from the regenerated acid solutions, treating the regenerated acid solutions to convert the ferrous iron into the ferric condition, and then again applying the regenerated acid ferric iron solution to the ore to dissolve more copper.

19. A process comprising treating ores of metals with an acid solution containing salts of the variable valent elements to dissolve the metals, separating the resulting metal solution from the ore, precipitating the metals in the solution with a precipitant capable of reducing the variable valent salts in the solution from a higher to a lower valency with the simultaneous regeneration of acid which are capable of being so precipitated, separating the metal precipitate from the reduced and regenerated acid solution, electrolyzing the solution to raise the valency of the salts of the variable valent elements from a lower to a higher valency, and returning the regenerated solution to the ore.

20. In the metallurgical treatment of ores in which copper is dissolved from its ores with an acid solution and then precipitated from the solution with hydrogen sulphide with the simultaneous regeneration of acid, the process comprising separating the copper sulphide precipitate from the regenerated acid solution, and then electrolyzing the sulphide precipitate as an emulsion and agitating the emulsified precipitate during electrolysis.

21. A process comprising treating ores of copper with an acid solution of ferric salts to dissolve the copper, precipitating the copper from the solution with hydrogen sulphide with the simultaneous regeneration of acid and the reduction of the ferric salts to the ferrous condition, separating the sulphide precipitate from the regenerated acid solution, electrolyzing the solution to convert the ferrous salts to the ferric condition, returning the regenerated acid ferric salt solution to the ore, applying the sulphide precipitate to a solvent capable of dissolving the copper from the sulphide precipitate and capable of being regenerated by the electrolysis of the resulting copper solution, and electrolyzing the resulting copper solution to deposit the metal and regenerate the solvent for the sulphide precipitate.

22. A process comprising treating ores of copper with an acid solution to dissolve the copper, precipitating the copper with hydrogen sulphide with the simultaneous regeneration of acid, separating the sulphide precipitate from the regenerated acid solution, returning the regenerated acid solution to the ore, applying the sulphide precipitate to a solution of ferric salts to dissolve the copper, and electrolyzing the resulting copper solution containing salts of iron to deposit the copper and regenerate the ferric salt to dissolve more copper from the sulphide precipitate.

23. A process comprising treating ores of copper with an acid solution containing salts of iron to dissolve the copper, precipitating the copper with hydrogen sulphide with the simultaneous regeneration of acid, separating the resulting sulphide precipitate from the regenerated acid solution, treating the solution to convert the ferrous salts into the ferric condition, applying the solution to the ore, applying the sulphide precipitate to a solvent capable of dissolving the copper and of being regenerated by the electrolysis of the copper solution, and electrolyzing the resulting copper solution to obtain the electrolytic metal and regenerate the solvent for the sulphide precipitate.

24. A process comprising treating ores of copper with a solution containing ferric salts to dissolve the copper, chemically precipitating the copper from the resulting solution, electrolyzing the precipitated solution to convert the ferrous salts into the ferric condition, returning the solution to the ore, applying the resulting chemical precipitate to a solution of ferric salts to dissolve the copper, and electrolyzing the resulting copper solution to deposit the metal and regenerate the solvent for the chemical precipitate.

25. A process of extracting copper from its ores comprising, treating the ore with an acid chloride solution to extract the copper, chemically precipitating the copper from the resulting solution containing salts of iron with the simultaneous regeneration of acid, then treating the resulting solution freed from copper to convert the ferrous iron into the ferric condition, and then again applying the solution to the ore.

26. A metallurgical process comprising, treating ores of copper with an acid solution containing salts of iron to dissolve the copper, separating the copper solution from the ore, chemically precipitating the copper from the solution with a precipitant capable of regenerating acid, separating the regenerated acid solution from the copper precipitate, and then electrolyzing the regenerated acid solution freed from copper to raise the valency of the iron salts in the solution and returning the regenerated acid and ferric salt solution to the ore.

27. A metallurgical process comprising, treating ores of copper with an acid solution containing salts of iron to dissolve the copper, separating the copper solution from the ore, chemically precipitating the copper from the solution with a precipitant capable of regenerating acid, separating the regenerated acid solution from the copper precipitate, and then agitating the regenerated acid solution freed from copper and electrolyzing it with carbon anodes to raise the valency of the iron salts in the solution and returning the regenerated acid and ferric salt solution to the ore.

WILLIAM E. GREENAWALT.

Witnesses:
SYLVIA PEARL JACOBS,
GEORGE C. COCHRANE.